United States Patent [19]
Bezek et al.

[11] Patent Number: 5,517,642
[45] Date of Patent: May 14, 1996

[54] INFERENCING PRODUCTION CONTROL COMPUTER SYSTEM

[75] Inventors: John D. Bezek, Owego; Peter M. Kogge, Endicott, both of N.Y.

[73] Assignee: International Business Machines, Inc., Armonk, N.Y.

[21] Appl. No.: 355,948

[22] Filed: Dec. 14, 1994

Related U.S. Application Data

[60] Division of Ser. No. 699,112, May 13, 1991, abandoned, which is a continuation-in-part of Ser. No. 611,594, Nov. 13, 1990, abandoned.

[51] Int. Cl.$^6$ .................................................. G06F 15/18
[52] U.S. Cl. .................................. 395/600; 395/61
[58] Field of Search ............................. 395/800, 600, 395/435, 64, 52–61

[56] References Cited

U.S. PATENT DOCUMENTS

| | | | |
|---|---|---|---|
| 4,849,905 | 7/1989 | Loeb et al. | 395/64 |
| 5,259,066 | 11/1993 | Schmidt | 395/54 |

OTHER PUBLICATIONS

Venkatesh Krishnaswamy et al., "The Architecture of a Linda Coprocessor," 1988 IEEE, pp. 240–248.
Sudhir Ahuja et al., "Linda and Friends," *Computer*, 1986, IEEE, pp. 26–34.
Lawrence Chisvin et al., "Content Addressable and Associative Memory," Jul. 1989, IEEE, pp. 51–64.
Chie Dou et al., "CAPMA–A Content–Addresable Pattern Match Architecture for Production Systems", Proc. Int'l Conf. on Application Specific Array Processers, 1991, IEEE, pp. 236–248.

*Primary Examiner*—Paul V. Kulik
*Attorney, Agent, or Firm*—Eugene I. Shkurko; Richard M. Goldman

[57] ABSTRACT

A computer system, and its parallel and serial implementations, its serial and parallel network and multi-processor configurations, with tight and loose coupling among processors. The computer system has a CAM coupled to the computer system or imbedded therein. CAM requests may be processed serially, or as parallel queries and coupled with PAPS (Parallel Associative Processor System) capabilities (P-CAM). The computer system may be configured as an expert system preferably having combined tuple space (TS) and CAM (content addressable memory) resources, an inference engine and a knowledge base. As an expert system, improvements for production processing are provided which surpass prior art performance represented by RETE and CLIPS. An inferencing process for production systems is disclosed, and a process for working memory element assertions. The computer system is provided with a language construct which is language independent in the form of a sub-set paradigm having three basic operators and three basic extensions. The basic primitive sub-set paradigm including OUT( ); IN( ) and READ( ). Extensions of said basic sub-set are Sample( ); SampleList( ); and ReadList( ). These primitives may be used with LINDA, and with various compilers. EVAL of LINDA is not used but instead the sub-set paradigm is used with CAM for tuple space operations in data base applications. The language construct paradigm is use to envelope and control CAM operations.

8 Claims, 4 Drawing Sheets

INFERENCING PRODUCTION CONTROL COMPUTER SYSTEM

This is a divisional of application Ser. No. 07/699,112 filed on May 13, 1991 abandoned, which is a continuation-in-part of Ser. No. 07/611,594, filed Nov. 13, 1990, abandoned in favor of Ser. No. 08/356,925 filed Dec. 14, 1995.

FIELD OF THE INVENTION

These inventions relate to computers and computer systems, and particularly to inferencing processes and devices for expert systems.

CROSS REFERENCE TO RELATED APPLICATIONS

Filed concurrently herewith are related applications:
COMPUTER SYSTEMS OPERATIONS CONTROL No. 07/699,410, filed May, 13, 1991 sometimes referred to as "Sub-set Paradigm", now abandoned.
CONTENT ADDRESSABLE MEMORY COMPUTER SYSTEM J. D. Bezek; P. M. Kogge; U.S. patent application Ser. No. 07/699,413, filed May 13, 1991 sometimes referred to as "C-CAM", now abandoned in favor of U.S. application Ser. No. 08/310,005, filed Sep. 21, 1994.

These co-pending applications and the present application are owned by one and the same assignee, namely, International Business Machines Corporation of Armonk, N.Y.

The descriptions set forth in these co-pending applications are hereby incorporated into the present application by this reference.

BACKGROUND OF THE INVENTIONS

Computer systems of various kinds have been around and used in commerce for about 40 years. Usually a system designer has an undergraduate college degree, typically in computer science or in electrical engineering. This training includes general instruction in the principles of computers, in physics, in the calculus and in boolean algebra—that branch of algebra dealing with logic design. In addition there is some training given usually in the function of standard circuits which have been used in the past, such as what is a gate, what is an adder and what is a multiplier. Electrical engineers are exposed to drafting and have additional training in areas of specialization, whether it be power, board design, or some other work. At the end of their training they are expected to be able to design some simple board level circuits with available logic parts and to measure current and voltage of components at different points. They usually learn BASIC and PASCAL as computer languages.

Computer Science majors generally also have training in additional languages used in commerce, COBOL, FORTRAN and C being those normally learned. Usually normal engineers and students do not have access to the most advanced equipment and systems. Usually they don't have access to or experience with the equipment and facilities which may be available to others working in a narrow field of specialization. Students generally have access to DOS as an operating system applicable to IBM's PC and some of its older advances which have been copied by other companies which have made "clones" of IBM's XT and AT. These computer people generally also have access to other systems which have been developed by IBM, such as systems based on the 360/370 operating systems. Many student computer laboratories workstations use a reduced instruction set computer architecture developed by IBM in the last decade, a so called RISC system exemplified by the SUN Microsystems workstations and IBM's RISC/6000 machines. These machines use the UNIX operating system and are generally made available to students majoring in the software area of computer science. The machines that the students use in their education are often stand alone systems, but they usually have access in a computer laboratory to a mainframe such as the IBM mainframes based on the S/370 architectures which have been used for the last two decades, or other machines of similar vintage such as one sold by Digital Equipment Corporation, a VAX.

All commercial systems are continually improved. The inventions made by those working in the field are often introduced as changes to machines, often resulting in further improvements which are made as a result of either an appreciation by someone that the new improvements will help them solve frustrating situations that they have lived with in the past or since the new improvements lead to new frustrations because experience leads to a new frustration or felt need. These frustrations and felt needs lead to new inventions as the technology develops. Frustrations cause wishes. Wishes may be satisfied by by purchase of additional items selected from an assembled group of possible sources which state that the items are applicable to a specific need (building blocks or stated solutions) if these building blocks are available. Otherwise, the lead to the development of new improvements and features to fulfill the wish list.

This quest for fulfillment may lead those involved to search out experts in an area of specialization in order to solicit their views and to examine the printed work of others which are available to those wishing to fulfill their own needs or to satisfy the wishes of others. Such wishes may arise from the need to satisfy a particular immediate problem not faced before by an individual who has a task to accomplish or as a desire to provide for many people a means to allow them to have a better life by relieving some continual drudgery that has been faced for many years. Examples of wishes include a wish to move a load of materials down a river over a rapids without having to unload the material from a carrier; another wish might be a desire to allow communication over distances greater than the human voice shouting range. Other wishes may be for a way to clean a carpet or garment or to solve a mathematical problem more easily and quickly. Sometimes the wish arises because an impediment to a task has been placed in the path or stream required to be traversed.

Sometimes the wish is satisfied by a discovery that something which has existed may satisfy the wish. Sometimes the wish is satisfied by long and painstaking experimentation with known elements. Sometimes the wish may be satisfied by a recognition that something present needs to be eliminated to make a job easier, or something present is surplus and not needed to solve a need even though it may remain available for other uses. Sometimes the wish is satisfied by the recognition that a previously unrecognized symmetry or relationship among elements exists which when combined in the newly recognized manner will satisfy the wish. This combination or newly recognized manner of combining things may result in addition in a new synergy, something that will be useful in other areas, something that may be recognized, in the colloquial as "neat". As the satisfaction of needs of one person, if not communicated, passes with time, we all appreciate the efforts of authors and inventors who have made their work known so that we ourselves can draw upon their toils and can promote the useful arts and other areas of human enjoyment. This body of information and work has become known where applicable as the "technology" which we now enjoy.

Usually the first two or so years of a system designer's career are devoted to work related to the need to satisfy the wishes of others. Usually the position is one of employment with others. Generally a systems designer is assigned some part of a system, usually a task of implementing a design of others. This work is often tedious and time consuming. Just the analysis of timing of a circuit may take a very substantial amount of time in order to make different building blocks of the design interact as intended by the designer. The creation of a report of a particular kind based upon a group of collected data may take a programmer many hours with some of the "technology" of today.

Some prototypes make use of building blocks already created by teams of experts to enable a solution to some generic problems which have been recognized as technical areas requiring specialized solutions for particular purposes, such as the electronic building block of TTL (transistor—transistor logic) logic which have prototype advantage that they are self clocking. Some areas of "technology" have been more widely adopted than others. An example of a recently widely adopted technology is the RISC architecture and the paradigms used in this area. Part of the reason for this is that only a relatively small group of research and development personnel of great expertise may grasp a solution which leads to the satisfaction of a wish and an advancement in the state of the art, when each one of say twenty five developers contributes his or her own inventions to the whole development.

These improvements may be useful for others and may become new paradigms in the art in a particular area of development. New processes speed processing and provide building blocks for future progress.

Our work is useful in improving the speed of operations needed by others such as the United States Government for improving production systems. These systems in the past have used CLIPS and the RETE algorithm (FIG. 4 herein).

Our work may be used for performing inferencing for forward chained rule-based expert systems. A forward chained expert system, see references 2 or 4,, uses a set of rules, the rule set, and a set of facts, working memory (WM), to deduce new facts.

Conventional OPS-like forward chained inferencing systems (See Reference 2) typically use the RETE match algorithm shown in FIG. 4 and described in Reference 3) for the efficient matching of rule LHS productions against WMEs. This method is a eager evaluation method that is not optimized for use when a high speed pattern marcher is available. Regarding expert system inferencing, eager evaluation means that all the possible processing consequences of adding a new WME are taken to their limit of evaluation.

The RETE algorithm takes the input rule patterns and builds a tree structure of test nodes, also called alpha tests, and join nodes, also called beta tests. See the example of prior art in the FIG. 4 which shows an expert system rule written in the CLIPS language and a potential RETE network for that rule's LHS patterns.

Test nodes check a portion of the WME against a criteria and pass the entering WME to the next node on the tree path only if the criteria is satisfied. Test nodes have one in path and one out path. They act as filters.

The preferred embodiments of our inventions disclosed provide new paradigms which will be useful to others in the field of the invention. In addition they are useful in connection with the inventions disclosed in the related applications and may be combined with the inventions disclosed there to promote further progress in the art.

As background for those reviewing our work, it will be recognized by some that there are commercially available CAM devices. CAM devices were developed first over twenty years ago. LINDA has been used widely by experts in computer field for the better part of the last decade. Apparently, a group of very expert researchers have used LINDA in connection with a machine a MIMD parallel processing system, in which LINDA processes communicate through a globally shared associative memory mechanism which they consider as Tuple Space. In the description of that system, it was stated that the unit of communication was a tuple, a self-contained object containing an arbitrary number of data elements. Processes communicated by adding, reading and withdrawing tuples from tuple space though the operations "out( ), rd( ), and in( )" respectively. The operators which we describe as OUT, IN and READ, like the "out( ), rd( ), and in( )" available with commercial LINDA compilers may be considered as having, in the general context, similar operator definitions. The Architecture which was described in the earlier work referenced (1) was not employed for a CAM system where each co-processor had one or more CAMs to communicate with as our development has. It utilized a general global memory to which tuple space was assigned, and a co-processor CPU was employed to switch in and out of global memories and working buffer memory from requests passing on a bus, as illustrated by FIG. 4 of the report of their work as referenced herein (1).

REFERENCES USED AS EXAMPLES

References which will be referenced in the detailed description are:

1. Krishnaswamy, V.; Ahuja, S.; Carriero, N.; Gelernter, D., Article "The architecture of a LINDA co-processor." 15th Annual International Symposium on Computer Architecture (Cat. No. 88CH2545-2). IEEE. ACM 1988, Honolulu, Hi., U.S.A. 30 May–2 Jun. 1988, pp. 240–249.

This article is the only reference which a hindsight search has shown to describe a LINDA Machine architecture where processes communicate with a Tuple Space (TS) with an associative memory. The described system differs from our own work, and does not have the improvements and features which are described here. The common global memory structure of their report is shown in FIG. 4 of their article.

2. Brownston, L.; Farrell, R.; Kant, E. and Martin, N.; reference entitled *Programming Expert Systems in OPS5*. Reading, Mass.: Addison-Wesley, corrected printing, 1986. This book discusses expert systems in general. The RETE algorithm and the OPS-5 expert system language and environment is discussed. The areas that may be reviewed are:

(A) Prod. Sys. general reference, pp. 4–27; and (B) RETE algorithm reference, pp. 228–239.

3. Forgy, Charles, work entitled: "RETE: A Fast Algorithm for the Many Pattern/Many Object Pattern Match Problem," *Artificial Intelligence*, Vol. 19, pp. 17–37, September 1982, describes and serves as a reference for the explanation of the RETE algorithm.

4. Giarratano, J. and Riley, G., *Expert Systems, Principles and Programming*. Boston: PWS-KENT, 1989. This book discusses expert systems in general, the RETE algorithm, and also has sections about the CLIPS expert system language and its environment. The sections that may be reviewed are:

(A) Prod. sys. general reference, pp. 1–23, 31–48;

(B) RETE algorithm reference, pp. 501–505: and (C) CLIPS language reference, pp. 373–397, 424, 428.

5. Kohonen, T., *Content-Addressable Memories*. Berlin: Springer-Verlag, second edition, 1987.

This book discusses content addressable memory (CAM) and is referenced as a general introduction to CAMs, see pp. 1–10.

Additional references, duplicating the some of the above, used in connection with the description of C-CAM and the Sub-Set Paradigm are:

1. Krishnaswamy, V.; Ahuja, S.; Carriero, N.; Gelernter, D., Article "The architecture of a LINDA co-processor." 15th Annual International Symposium on Computer Architecture (Cat. No. 88CH2545-2). IEEE. ACM 1988, Honolulu, Hi., U.S.A. 30 May–2 Jun. 1988, pp. 240–249.

This article is the only reference which a hindsight search has shown to describe a LINDA Machine architecture where processes communicate with a Tuple Space (TS) with an associative memory. The described system differs from our own work, and does not have the improvements and features which are described here. The common global memory structure of their report is shown in FIG. 4 of their article.

2. Ajuga, S.; Carriero, N. and Gelernter, D.; the reference entitled: "LINDA and Friends,"; *IEEE Computer*, Vol. 19, No. 8., pp. 26–34, August 1986.

This reference describes the four LINDA operators IN, OUT, READ described herein and the additional operator EVAL referenced but eliminated from use in our preferred embodiments. It has no mention of content addressable memory.

3. The Article by Carriero, N. and Gelernter, D., entitled "How to Write Parallel Programs: A Guide to the Perplexed," *ACM Computing Surveys*, Vol. 21, No. 3, pp. 323–357, September 1989.

This reference is a more extensive description of the LINDA standard operators. It gives examples and techniques for writing parallel code using LINDA operators.

4. Kohonen, T., *Content-Addressable Memories*. Berlin: Springer-Verlag, second edition, 1987.

This book discusses content addressable memory (CAM) and is referenced as a general introduction to CAMs. See pp. 1–10.

5. *AMD Memory Products*. Sunnyvale, Calif.: Advanced Micro Devices, 1989, describes a CAM chip which has been available from a commercial U.S.A. company, Advanced Micro Devices.

6. *Coherent Processor Development System*. Syracuse, N.Y.: Coherent Research, Inc. 1989, like reference 5 describes a CAM device. However this reference describes the machine which we used to develop a prototype which works satisfactorily. The content addressable memory chip and a PS/2 card were made available for our research from Coherent Research, Syracuse, N.Y.. We used this card in the machines we used for our prototype development work.

As these references can be used as examples, they are incorporated herein by reference. There are many separate references which probably exist and could be employed to describe some sort of computer which has alternatively tuple space or a CAM.

As a result of our work new building blocks will be made available for others in the field of computers.

DEFINITIONS

While dictionary meanings are also implied by certain terms used here, the following glossary may be useful.

A computer is any general purpose or specialized computing machine having at least an ALU (Arithmetic Logic Unit), a memory (general purpose store) and an operating system capable of handling and processing instructions and data which is to be processed in accordance with an instruction sequence processed by the computer, generally thought of as a computer system. A computer system may include additional elements and generally does include a numbers of such elements which interact to perform a planned function. Such elements may generally include mass storage for instructions and data, special stores for repetitive instructions, input and output functional elements including display, communication and printing interfaces and connections. A Turing machine is an example of a computer system, but generally computers employ more elements. A S/370 machine is a computer system, and similarly a RISC/6000 is one. S/370 and RISC/6000 are trademarks of International Business Machines Corporation, Armonk, N.Y., U.S.A.. RISC means a computer system which utilizes a reduced instruction set of instructions to process data, reduced as compared to other systems such as the mainframe systems represented by the S/360–370 architectures.

A general purpose computer is a computer which is not designed to perform too specialized a task. A general purpose computer may be of the kind represented by many machines in commercial use variously referred to as mainframes, workstations, and as business and personal and scientific computers. These machines may process instructions and data in serial and or in parallel. The word length may vary. These general purpose computers operate with a base operating system, may utilize additional operating systems, and have the capability of processing a program (software) written for use by the system. When the program is run, the operating system operates with instructions which are originally formulated for use by the computer for the particular operating system itself by processing a program by an interpreter or compiler. The interpreted or compiled program has been written in either a high level language or an assembler language by a person, or by extraction from other programs available to the system.

An expert system is a computer system with memory which processes information pertaining to a particular application and performs functions similar to that of a human who is expert in the field of a particular application. It is similar to and sometimes is used interchangeably with a knowledge based system. It uses an inferencing engine, a knowledge base derived from selected human experts and knowledge engineering. Somewhat like a human expert, the computer system when running application programs can solve problems by drawing inferences from a collection of information that is based on expert human experience and problems that the system has previously encountered. It is in the field of artificial intelligence that expert systems are employed in commerce.

The knowledge base is accessed in accordance with rules established for the expert system with which the knowledge base is to have interaction or which is accessed in the processing of information by an expert system.

An inference engine refers to the components of an expert system (a computer system having an expert system loaded) such as a (cluster of) connected processor(s) and associated software that apply principles of reasoning to draw conclusions from the information stored in a knowledge base.

A knowledge base is a data base that contains information about human experience in a particular application and data resulting from any problems previously solved by a computer which has access to the stored data and instructions for looking to the defined necessary stored data.

Knowledge bases generally are some sort of relational data base but can be structured as other data bases. CLIPS is a language used to write rules for an expert system.

WME as used here refers to working memory elements of a computer system using an expert system.

A distributed system includes several computers. These computers may be tightly coupled (operate by coupling to a common bus through which instructions and/or data pass or by sharing a common global memory) or loosely coupled by a network coupling. Such a network may have both tightly coupled and loosely coupled computer systems. Such a network will comprise a group of computers which are interconnected by some interconnection scheme, some means to pass electrical and/or optical signals back and forth between the systems over the telephone networks, hardwired networks and/or satellite networks, or combinations thereof, for either serial (bit by bit) or parallel (word or sub-word by word or sub-word) passing of information and control signals. Unless otherwise restricted by necessity or usage, a network of computers may be either synchronous or asynchronous. All computers may be clocked to a single system or may have independent timing within an environment. The network may include a switching system such as a cross bar switch (typical of the switching computers used by the telephone company) or more sophisticated systems such as the networks which have a switch and control system at each node to allow switching between computers anywhere on the network, with or without a handshaking protocol.

A data base is a store of data available to the system. There are generally hierarchial data bases, network data bases and relational databases.

A relational data base is one that is organized and accessed according to the relationships between data items. In a relational data base, relationships between data are expressed by means of tables in which generally rows are expressed to represent tuples, and columns represent attributes. As differentiated from other data bases, relational data bases use data values rather than pointers (hierarchial) or location (network) for data items resident in memory.

A tuple in connection with a relational data base is a part of a relation that identifies an entity and its attributes. Normally a tuple is one row of a relation table. However, tuple space may occupy more than one row.

Tuple space is that space in a memory used for relational data. Usually tuple space is an assigned area of memory a register used to transfer and store tuple information.

An entity in a data base is anything about which information can be stored and may include a concept, a physical element, or an event, a user, group or resource, such as a DASD (direct access storage device) data set or a tape volume that is defined to RACF (resource access control facility).

An attribute is a property or characteristic of one or more entities and in a data base is a data element (word or bit or group of bits or words) which described the properties of another data element which may represent an entity or another attribute.

A parallel computer is one which processes words or parts of words in parallel through an ALU (arithmetic logic unit or information processing unit) system as differentiated from serial processing.

CAM means herein not computer aided manufacturing but associative storage or associative or Content Addressable Memory. This is a storage device or subsystem or part of another memory system where data and instructions are defined by their contents or by part of their contents rather than by their names and positions (addresses typically used by general purpose computers). Computers can have a CAM as well as additional storage. Commercially, in the past, CAMs have been used in large parallel machines. Examples include large S/370 systems and the CRAY computer, but other smaller systems have had such CAMs. In CAMs data is generally either addressed or accessed in an associative fashion from storage. A CAM at the minimum comprises two elements, a store (typically a CAM memory array) and a pattern register. It may also include a mask register, and typically it includes a match register.

A CAM Memory Array is a group of storage or memory cells organized so that several strings of interrelated data (such as used in a relational data base) can be addressed or accessed and examined as to contents at the same time.

A pattern register is a device which stores the criteria for evaluating whether or not there is within the CAM data which can be likened to a string of data (temporarily) stored in the pattern register.

A mask register is a device which acts like a filter through which data in the pattern register is filtered before the memory array of the CAM is addressed or accessed.

A match register is a store which is used to store the result of access to a CAM.

A register is a store or memory area which stores specific signals as signals which may be evaluated as being set or not set locations.

A co-processor is a computer element which acts in concert with another primary computer element. Co-processors have typically been assigned specific processing tasks to perform, e.g. to handle either application programming— e.g. word processing; or I/O (input/output)—e.g. printing. Some co-processors may be used to process routines also handled by other coprocessors of the same computer system.

Language means a set of characters or conventions and rules that is used for conveying information as a programming language in a computer system. A language construct in a programming language is a syntactically allowable program or subroutine that may be constructed in accordance with the set of rules that make up the grammar of the language of a computer system. The grammar of the language is used as a paradigm for the computer to follow in processing operations. The grammar or paradigm, the operational steps, defines the steps and sequences which are to be used in processing information to and from elements of the system including the ALU and storage. The grammar is a defined set of operations which control, when implemented, the computer. The language or language construct is the entire set of grammar used by the computer. A language sub-set is a specific defined part of the language construct. The language is implemented by a program entry in the form of a language statement provided by a user. The language and specific language subsets are the building blocks by which users make computers perform tasks for them.

Paradigms are models or sets of computer operation control forms which may be used by a language but may be language independent. A paradigm sub-set is a defined grammar part which may be included as part of a defined language. It is a basic computer relationship building block and defines a set of operations of a computer.

LINDA is a set of operations or paradigms which are language independent. The definition of LINDA originated at Yale university, and LINDA has been adopted as a trademark of Scientific Computing Associates, New Haven, Conn., U.S.A.. It is used in connection with language compilers and operating systems with LINDA operations integrated therein. They are available as named systems such as C-LINDA and Fortran-Linda. The operations have been ported to and/or incorporated into many languages and compilers by many groups. Several commercial implementations are now being done by various companies—See "How to Write Parallel Programs", page 324, footnote 4 of the references cited.

CLIPS refers to a C Language Integrated Production System which was developed for the Artificial Intelligence Section at NASA/Johnson Space Center. CLIPS is available to the private sector via NASA's distribution mechanism: COSMIC (TM) from the Computer Management Software and Information Center, The University of Georgia, Atlanta, Ga., U.S.A.. The named program, CLIPS, is now available from COSMIC with all source code. It has been also made available to those knowing about it on a diskette (executable only, with example CLIPS programs, not source) in the Giarrantano and Riley reference, "EXPERT SYSTEMS, Principles and Programming".

A parallel associative processor system (PAPS) is a computer which processes in parallel accesses (or accesses or addresses in parallel) associative storage. A currently preferred example of such a system is the system described in the referenced patent application of a similar title and referred to as P-CAM. Such systems may be part of another computer system and may be parallel or serial systems of the general purpose type or more specialized systems.

SUMMARY OF OUR INVENTIONS

We have provided computer system with expert system resources and in our preferred embodiment it has a CAM (preferably a C-CAM or P-CAM) as a resource for the expert system. This system is provided with our process system and includes the devices and described inferencing systems which process forward chained reasoning systems and which use underlying high speed content addressable memory matching hardware. This new process overcomes limitations in, and the unnecessary overhead of, conventional forward chained inferencing systems when a CAM is used to perform the underlying pattern matching.

The processes and preferred embodiments of the hardware for a computer system have the benefits provided:

1. lazy evaluator, doing processing only when it has a near guarantee of success.

2. providing extremely simple and thus fast WME delete action, and 3. an underlying CAM, which with our preferred new operators alone or in addition can be used to accelerate the critical matching components.

The new inferencing process is implemented by a computer system, preferably one having a CAM or P-CAM environment resource. An inferencing process is provided:

a. If there are any entries on the check list then the steps of the process uses rule LHS to examine for potential satisfaction.

b. The rule R with the highest salience, or priority, is selected and is removed from the check list.

c. A full pattern match of R's LHS patterns against WME's is now performed. Again, all matching is done in the CAM, thus resulting in a processing time $O(:hp1.R:ehp1_p)$, where $:hp1.R:ehp1_p$ is the number of LHS patterns in R.

d. If all LHS patterns had matching WMEs in WM, the rule is satisfied. The refraction check is performed and if passed, i.e. not a duplicate firing, the rule is placed onto the agenda for firing.

e. If one or more LHS patterns did not match the rule is not satisfied. Should one or more of the patterns have no potential matching WME, it is concluded that the WME which set the corresponding satisfaction check bit has been removed from WM. The satisfaction check bit for that LHS pattern is cleared, thus preventing the rule from entering the inferencing algorithm until a new potentially satisfying WME is added to WM.

A WME Assertion process is provided as a desirable improvement. The process of matching working memory elements according to the rules leads to effects which are improved. The improvements to effects of WME assertion include the process steps described herein of:

a. WME assertion which consists of first asserting the WME W into WM. Since WM is contained in the CAM, this amounts to placing the encoded bit pattern representation of W into the content addressable memory.

b. The fact class :alpha. is now checked against the fact classes of all rule LHS patterns. This list of rule LHS fact classes is also maintained in CAM. Thus, this matching operation is performed in one CAM memory cycle.

c. Should there be any matches, see 1 in the chart, it is thus determined that W potentially satisfies one or more rule LHS patterns. See 3 in the chart.

d. Set the satisfaction check bits for the respective rule LHS patterns for each successful match above.

e. If any rule's set of satisfaction check bits is all set, that rule is eligible for the complete inference algorithm. Place that rule onto the check list.

Our new processes for inferencing in expert systems cooperate with the basic building blocks we have used in a synergistic manner. While they can be used in systems which do not have all of our building blocks, the best mode uses our sub-set paradigms and a C-CAM. Other improvements may be made with these new building blocks, and their combination with our expert system developments are also important advances. Therefore, we should also summarize in this presentation the following features.

Our new sub-set paradigms are illustrated by way of a statement in the detailed description. The three basic sub-set paradigms can replace or be selected from three of four basic operators that have for years been present in LINDA. We have added extensions which are particularly useful and new in the art.

Our paradigms can be used in connection with language constructs such as represented by LINDA and can be added to compilers, as LINDA constructs can be added to compilers.

Our paradigms are particular useful building blocks for CAM and P-CAM systems.

The content of a CAM enveloped by our sub-set paradigm set of defined operations is controlled by the priorities available in the subset paradigm. The subset paradigm is language independent and may be used by a process with different operating systems and also may be used by the system with compilers of differing languages. Because LINDA is a language construct which is independent and has constructs similar to some of the sub-sets we have defined, in our preferred embodiment LINDA is resident in the system because our paradigm can operate within the computer system having LINDA even though it does not use a basic operation of LINDA, the EVAL operation set. Indeed, while this EVAL function was thought to be a major advantage of the LINDA set, we find that it impedes operations.

While LINDA also contains the basic operations which we define as the basic subset paradigm, the three primitives IN, OUT, and READ, it also uses a forth primitive EVAL which is not used. Our primitives are especially useful in a CAM environment and in that environment are used to envelop and control the CAM. Our primitives have different specialized definitions for CAM operations with suspended tasks and with no suspended tasks. The equivalent function performed by the three primitives (without the extensions) sub-set paradigm was present in LINDA, but it has not been recognized as suitable for selection to accomplish the uses to which they have been used as we describe. For that matter we know of no other language which has primitives which have been used to envelop and control a CAM system, or which suggest that this would be desirable or which make a suggestion that this could be done.

We have also defined three additional primitive operations which extend the primitive operation set available within LINDA and which are useful not only in an environment which envelopes CAM but also are useful in the computer systems which do not necessarily have a CAM operational.

We have defined three primitives as a sub-set paradigm to be used in a computer system which are language independent constructs. These primitives are defined in the Table at the end of the detailed description. These three primitives are useful as tuple space operators (TS) and are:

1. IN (defined as also defined by LINDA)
2. OUT (defined as also defined by LINDA)
3. READ (defined as also defined by LINDA) A fourth primitive defined by LINDA is not used, this is the evaluation function which we believe is the operation definition defined by LINDA which is required for LINDA's prior use in connection with relational data bases. This evaluation function is named EVAL. We do not find it useful in our context or useful for the relational data bases which are processed by systems which use a CAM.

We have developed and defined a set of extensions to the primitives which are generally useful and particularly in computer systems having a CAM. These extensions are ReadList, Sample, SampleList. We use the primitives to envelop and CONTROL a CAM. These primitives are extensions of our own set and may be used in connection with other language independent constructs such as LINDA.

We have developed and defined the use of the sub-set paradigm and the extensions that we have defined and developed as applicable to general computer systems which use tuple space (TS). We have defined these primitives as applicable to CAM operations with suspended task(s) and also to CAM operations with NO suspended task(s).

The use of a CAM makes the base three operators present in LINDA suitable for real-time environments and our three operators which duplicate the operator function in LINDA make execution time independent of the number of entries in a database.

Our primitives have been useful in solving difficult problems. We have used it to develop systems to solve mapping problems. We have also used it to solve inferencing problems dealing with expert production rule inferencing. The uses are many.

These and other improvements are set forth in the following detailed description. For a better understanding of the inventions, together with advantages and features, reference may be had to the co-pending applications for other developments we have made in the field. However, specifically as to the improvements, advantages and features described herein, reference will be made in the description which follows to the below-described drawings.

BRIEF DESCRIPTION OF THE DRAWINGS

FIG. 1 illustrates a generic CAM computer system which is used to implement the inferencing process system in our preferred embodiment. Therein the computer 1 preferably uses a larger language construct represented by LINDA 2, and is provided with our sub-set paradigm 3. It is provided with a memory resource including content addressable memory CAM 4 which in turn provides tuple space TS. The computer has other conventional and unnumbered elements of a general purpose computer system, and has an interface 5 to coupled systems 6 which are described in the detailed description below.

Figure 1:
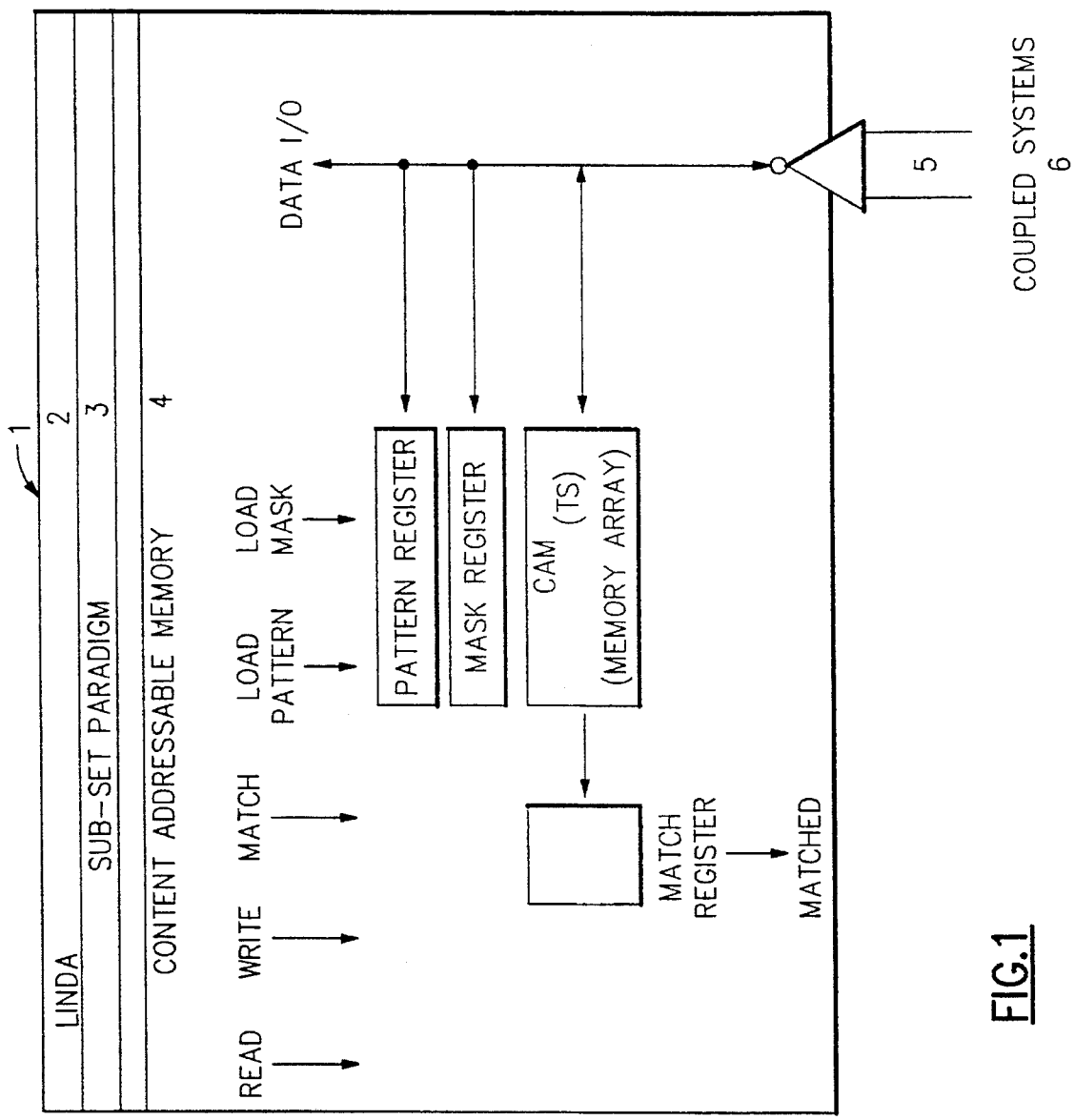
FIG. 1 illustrates a generic computer having a CAM of a generic type. In connection with the description of the Sub-Set Paradigm and C-CAM alternatively, FIG. 1 may also be referred to as also representing generically a P-CAM. The P-CAM which we now prefer is that described as a PAPS of the kind incorporated herein by reference to the P-CAM application referenced herein above.

Our detailed description follows as parts explaining our preferred embodiments of our inventions provided by way of example.

DETAILED DESCRIPTION OF THE INVENTIONS

Before considering our preferred embodiments, it may be worthwhile to illustrate, by way of example, some possibilities which we have further considered and discarded. Before we developed our preferred embodiments, computers existed which used expert systems to solve problems. CLIPS existed and so did LINDA. Separately so did systems which had CAM. Our need was to improve and speed up the processing of applications such as mapping, and we were asked to address ways which could be used as building blocks for others to increase the speed and efficiency of their applications. We found no equipment which was (relatively) inexpensive, yet effective. Particularly, we will first address the processes used for inferencing in expert systems or artificial intelligence applications, one field where our building block may prove especially useful as illustrated by the remarkable improvements we have had with the following described process.

In accordance with our inventions in our preferred embodiments illustrating the deduction operation may also be termed inferencing. It first applies the rule conditions, also called antecedents or rule Left Hand Sides (LHS), to the working memory elements (WMEs). The term WME is synonymous with fact. Those rules which have their component LHS patterns satisfied are placed onto an agenda.

Rules are taken from the agenda and their Right Hand Side (RHS) action components, which can perform input/output operations, modify WM, etc. when they are executed.

Join nodes compare the contents of two fields in a WME or across two WMEs. Join nodes have two IN paths, with a storage queue at each input, and one OUT path. When an assert, or add, WME enters the left (right) queue it is compared to all WMEs resident in the right (left) queue. Should a match occur, a new composite WME is constructed within the join node and is sent along the out path of the node. The original input WME remains in the queue which it entered. If multiple WMEs match in the right (left), multiple composite WMEs are constructed. Each is sent on the OUT path. A WME is deleted from a queue when a retract, or delete, WME enters the queue and one or more WMEs in that queue match. Those matching stored WMEs are deleted. A composite is built with each matching WME from the opposite queue and is sent along the out path.

A content addressable memory (CAM) which we have used in connection with the development of our prototype has been described in Reference 5. Such a device is also sometimes called associative memory and is useful for such pattern matching. When used, the RETE algorithm, although still efficient, adds significant unnecessary overhead to such a processing system. The process described herein is designed for use with inferencing systems where working memory is stored in content addressable memory. We believe this description to be original work not thought of by others.

Preferred Embodiments

The preferred embodiments which are described provide a novel control process and devices for use in inferencing systems which process forward chained reasoning systems and which use underlying high speed content addressable memory matching hardware. This new process overcomes limitations in, and the unnecessary overhead of, conventional forward chained inferencing systems when a CAM is used to perform the underlying pattern matching.

Our development has shown surprising results. We have in tests achieved demonstrable results of 600 times speed improvement, depending on algorithm design and format, while observing the new processes at work as compared to the described conventional implementation. This is the result of the processes' triple benefits of:

1. Being a lazy evaluator, doing processing only when it has a near guarantee of success, 2. Having an extremely simple and thus fast WME delete action, and 3. Using the underlying CAM, or with our preferred new operators to accelerate the critical matching components.

Our Preferred Embodiments

This section describes the two accompanying flow diagrams. The diagrams describe, at the functional level, the new inferencing process that developed.

Inferencing Process, the First New Preferred Example

Prior to discussing the new inferencing process, supporting description is given for:

A necessary data structure,

The refraction check operation.

Data Structure: Satisfaction Check Bits

This is a one word data item where each bit is assigned to one of the potential LHS patterns: least significant bit (LSB) to first pattern, etc. When a WME is added to WM, see complete description below, and the fact class matches a LHS pattern's fact class, that WME has the potential for being in the set of WMEs which will satisfy the LHS of the respective rule. To indicate this, the check bit for the appropriate rule LHS pattern is set. This indicates that a WME was added to WM which has the potential for satisfying the rule's LHS pattern.

When all check bits for a rule are set, the rule has the potential for being fired. While it is true that one or more of the WMEs may already have been removed by the time all satisfaction check bits are set, what is indicated is that WM may contain the WMEs to satisfy a rule's LHS patterns. At this point the rule is placed onto the check list.

This overcomes the eager evaluation strategy. The inference algorithm will not examine a rule's LHS patterns for WME satisfaction until there is at least a chance that the patterns will be satisfied.

Refraction Check

The implementation of the refraction check is not described in detail in this description, however its base purpose may be appropriate to a further understanding of the processes involved.

The purpose of the refraction check is to ensure that a rule does not fire multiple times on one given set of matching working memory elements (WMEs). For example, this can occur if two WMEs of different class types are added to WM and both are used in rule R. Rule R could appear twice on the check list where as in this example, there are two potentially satisfying WMEs which would contribute to LHS pattern matching.

When a rule R fires a given set of WMEs S, the WMEs form the set of satisfying facts for the rule's LHS patterns. It is referred to as the satisfaction set. The refraction algorithm ensures that any other appearance of R on the agenda, R', will have at least one element in its potential satisfaction agenda set, S', which is not in S. Thus, if R' fires at a later time it is guaranteed that it will be over a different set of satisfying WMEs.

Inferencing Process Description

Figure 2:
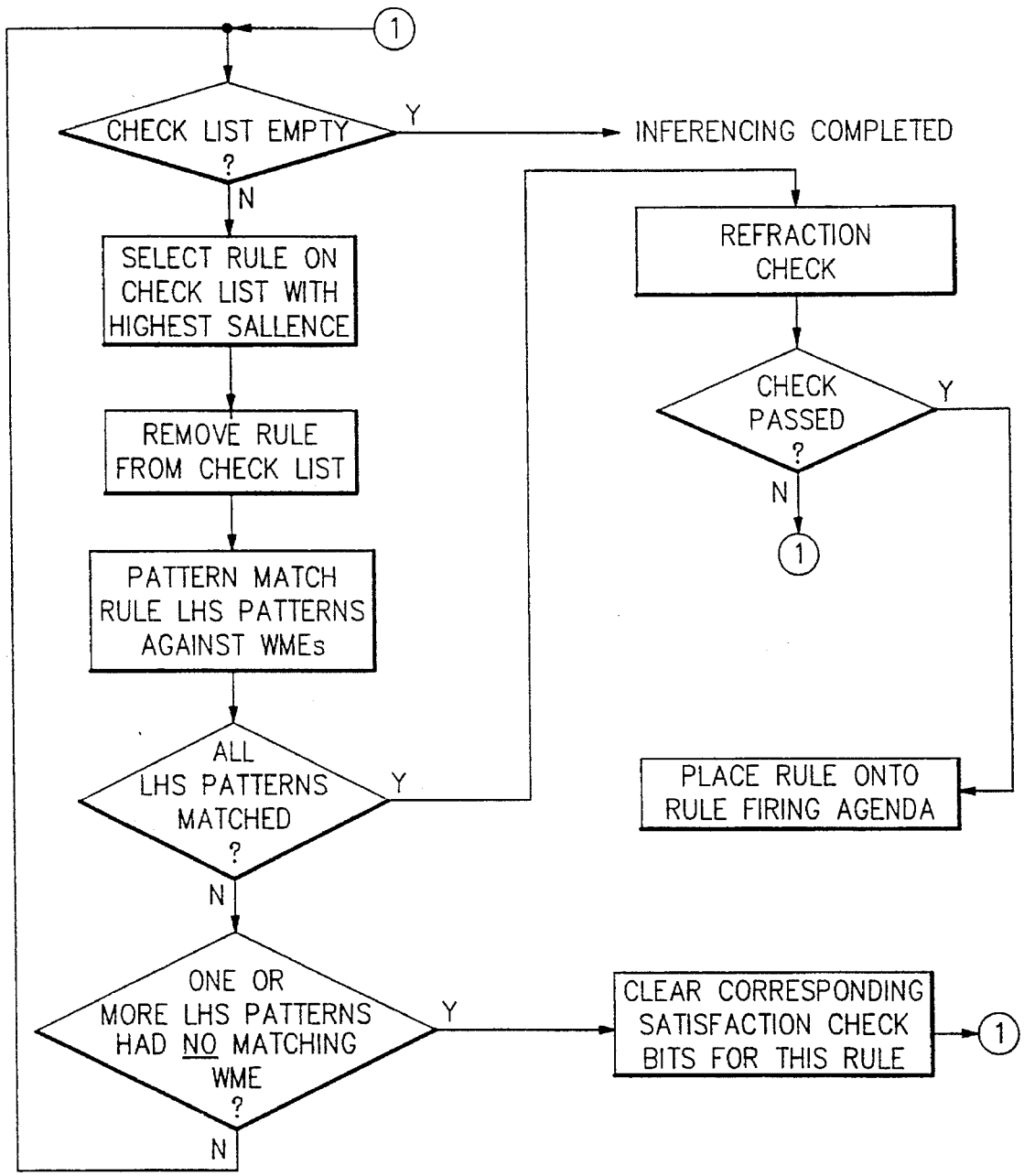
FIG. 2 illustrates as a flow chart the steps the system of our preferred embodiment will implement.

The new inferencing process is implemented by a computer system, preferably one referred to herein as a preferred CAM environment, by the steps illustrated in FIG. 2. FIG. 2 is described below:

1. If there are any entries on the check list, then the steps of the process uses rule LHS to examine for potential satisfaction.

2. The rule R with the highest salience, or priority, is selected and is removed from the check list.

3. A full pattern match of R's LHS patterns against WME's is now performed. Again, all matching is done in the CAM, resulting in a processing time $O(:hp1.R:ehp1_p)$, where $:hp1.R:ehp1_p$ is the number of LHS patterns in R.

4. If all LHS patterns had matching WMEs in WM, the rule is satisfied. The refraction check is performed and if passed, i.e. not a duplicate firing, the rule is placed onto the agenda for firing.

5. If one or more LHS patterns did not match, the rule is not satisfied. Should one or more of the patterns have no potential matching WME it is concluded that the WME which set the corresponding satisfaction check bit has been removed from WM. The satisfaction check bit for that LHS pattern is cleared, thus preventing the rule from entering the inferencing algorithm until a new potentially satisfying WME is added to WM.

WME Assertion Improved and Alternative Preferred Embodiment

Figure 3:
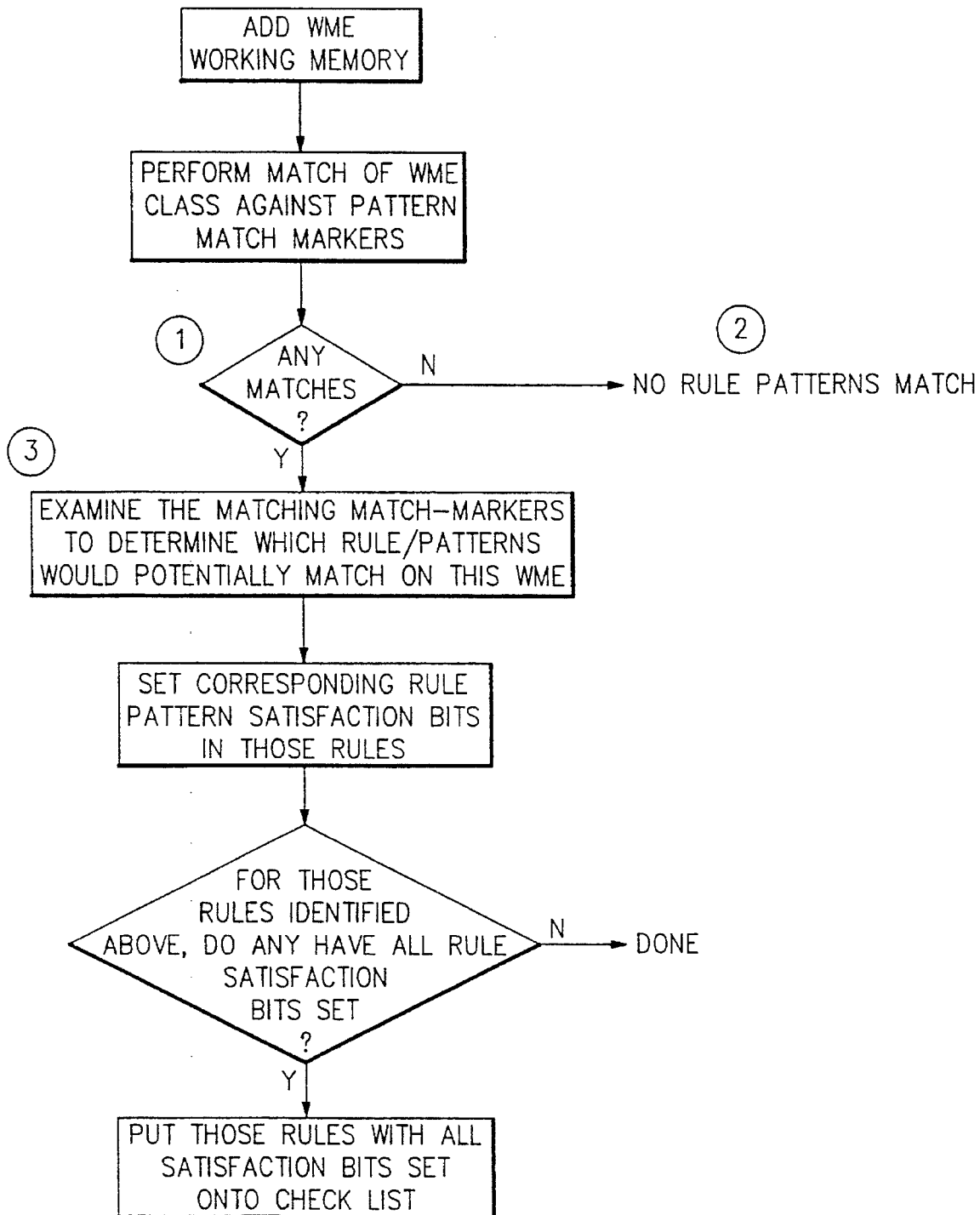
FIG. 3 illustrates as a flow chart the steps the system of our preferred embodiment will implement for WME assertions.
Figure 4:
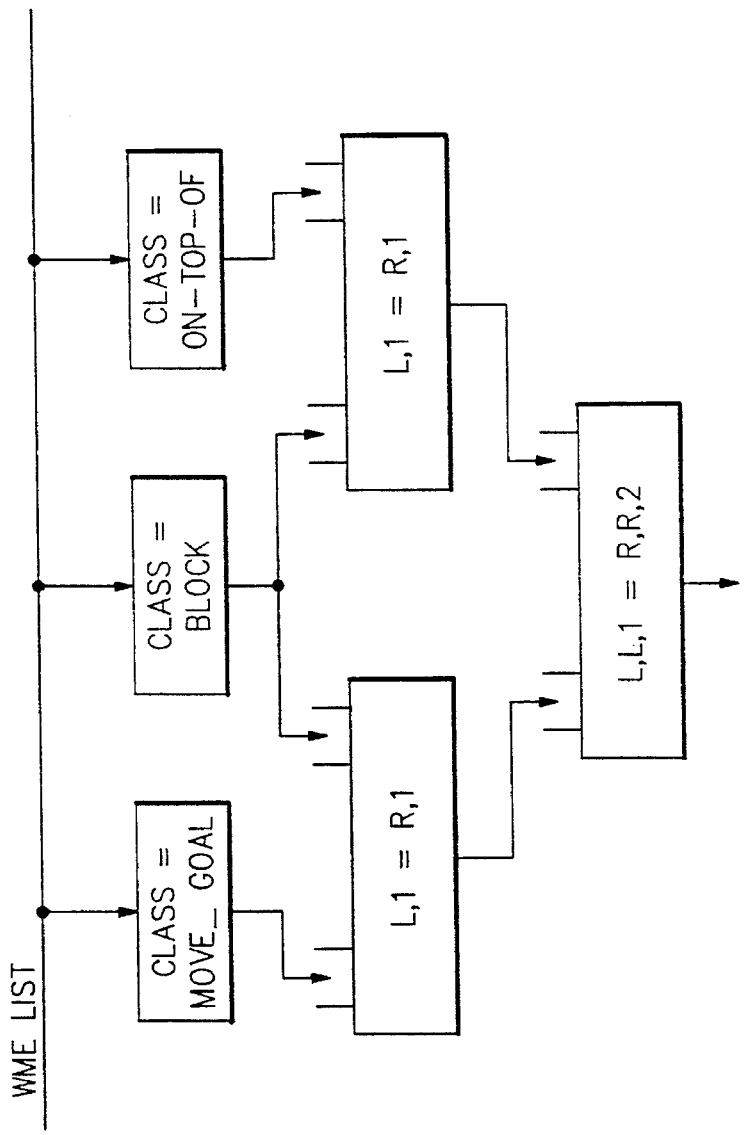
FIG. 4 illustrates a conventional RETE Algorithm Example as a flow chart which has the illustrated steps to follow for implementation in a machine. This prior art example does not have the performance we have obtained.

The process of matching working memory elements according to the rules leads to effects which are improved. The improvements to effects of WME assertion are now described. FIG. 3 illustrates the process by way of a flow chart example.

1. WME assertion consists of first asserting the WME W into WM. Since WM is contained in the CAM, this amounts to placing the encoded bit pattern representation of W into the content addressable memory.

2. The fact class :alpha. is now checked against the fact classes of all rule LHS patterns. This list of rule LHS fact classes is also maintained in CAM. Thus, this matching operation is performed in one CAM memory cycle.

3. Should there be any matches, see 1 in the chart, it is thus determined that W potentially satisfies one or more rule LHS patterns. See 3 in the chart.

4. Set the satisfaction check bits for the respective rule LHS patterns for each successful match above.

5. If any rule's set of satisfaction check bits is all set, that rule is eligible for the complete inference algorithm. Place that rule onto the check list.

Our best mode of using these improvements to date has been the use of a computer system with a CAM resource which has been described in copending applications. These resources will be described with respect to FIG. 1.

Problems Which Have Been Addressed

A Content Addressable Memory (CAM) is a memory device that permits data stored within it to be accessed by presenting the memory with a partial description of the data, i.e. a "pattern". Each entry in the memory concurrently compares its contents to that pattern. Entries with successful comparisons can then participate in actual data retrieval and manipulation operations.

CAM has been long used, in relatively small amounts, in large scale computers where specific operations such as cache or address translation lookup tables have warranted the cost. Recent semiconductor advances have permitted denser CAMs to be manufactured at significantly reduced costs, to the point where there is now enough capacity to permit more general applications where pattern matching over sets of data, like databases, is a crucial part of the problem.

However, until now there have been significant problems with actually utilizing this increased density:

1. The typical CAM has a fixed word length for each entry, on the order of 32 to 48 bits. Most real applications, however, require database "entries" that are often considerably longer. This requires the use of "tag bits" associated with each CAM word to indicate if it is the first, second, etc. word of a multi-word entry as seen by the application. Other bits associated with each word then keep track of whether or not their predecessors were successful matches and whether they should participate in the next word operations.

2. In environments where there are multiple concurrent tasks executing, an unbounded number of them may wish to access the same data in the same CAM during the same period of time. In either a multiprocessor or multiprogrammed configuration, this means that it is entirely possible for the CAM operations to retrieve a query from one process and for it to be interleaved with similar operations for other processors. When it is economically infeasible to implement multiple sets of tag bits for each CAM word, this can rapidly lead to total disorder and invalid responses from CAM searches.

A relatively new and well published parallel programming paradigm, which we have described, Linda, provides a software protocol for allowing multiple processes to share access to databases in a controlled fashion. Both data and patterns in the above sense are stored in the shared storage. For the remainder of this description the term tuple space (TS) will be used interchangeably with the name LINDA.

Until now, implementations of LINDA, as reported in the literature, have utilized relatively conventional software intensive "looping" searches through such databases for data entries and patterns that match. The speed of such searches is often a function of the total number of entries in the database, at best proportional to the log of the number of entries, and as such has been both slow and not suitable for real time applications where predictable time responses are desired.

PREFERRED SYSTEM EMBODIMENTS

The system which we describe has concepts which include:

Combining of a long and well known memory organization, CAM, with a relatively old and well published parallel programming paradigm, LINDA, which yields the express advantages of both and yields ease of programming for computer systems employing a CAM device.

(With reference to FIG. 1, a preferred embodiment of a computer will have the elements shown in the FIGURE, a CAM, content addressable memory in the form of a storage memory array, and an input device in the form of a parameter register which stores requests. In addition, a mask register is desirably provided to function to filter requests, and a results store or match register should be provided. TS is provided in the memory array. The machine may be a functional element of another computer system, may be part of several computers, may be an independent but communicating subsystem, and may form part of the other systems given here by way of example. All possible variants which are given by way of example may be considered as represented by FIG. 1. The programs which are used to state an application process will be compiled with a compiler which has the basic, and extended operators which we will describe. In our preferred embodiment this would be a C compiler with the described operator set paradigms which are compiler and language independent included.)

Using the sub-set paradigm with a CAM and TS and using the new extensions to the three basic TS operators we describe. These extensions add versatility to TS for the operation of managing the interface to a physical CAM device. Additionally, they provide an abstract model of the device allowing the underlying hardware to be changed or even simulated without requiring programming or interface changes in the application program which continues to use the CAM device through the consistent TS interface paradigm.

The use of content addressable memory to implement the basic TS primitives plus these extensions gives the following benefits:

Rapid searching of the tuple space components. The basic TS paradigm does not specify the underlying implementation technique. Thus, the operation times are fully implementation dependent. Using an internal binary tree ordering of the components, the best speed a conventional sequential computing system can achieve would approach O(log n). A more conventional approach would be to store the tuple components in a list or array, resulting in an O(n) performance speed. On the other hand, using a CAM results in an O(1) speed for the various TS operations and TS extensions.

The TS operations and extensions are time-constant regardless of the number of components in TS when a CAM is used. This is a second benefit of using a CAM. With our sub-set paradigm, CAM and TS accesses are not time constrained. These operations and extensions are time-constant also regardless of the substructure of individual components of the tuple space.

The CAM Solution

The solution description will first give an overview of CAM and programming limitations. Then an overview of the basic LINDA (TS) system and original LINDA primitive operations will be described. This is followed by an explanation of the new TS extension commands set forth by this disclosure. Finally, the use of TS to manage a CAM is described with the benefits described.

CAM Organization and Operations

A typical generic CAM is shown in FIG. 1. It comprises a memory array which is accessed by matching a pattern contained in the pattern register against the memory array contents. This is termed the Match operation or CAM Match and is done concurrently on all rows of the CAM. This pattern matching is performed under a mask supplied by the mask register. The mask allows selected portions of the pattern to be ignored during the match.

Each row of the memory array contains one match line on which the results of the pattern match against the respective memory array row are reported. A one-bit latch for each memory array row forms the match register array. The match lines from the memory array load one for one into the match register latches under control of the Match input control line. This line also directs the memory array to perform the match operation and to place the results onto the match lines.

The load pattern and load mask input lines cause the contents of the data I/O line to be loaded into the pattern or mask register respectively. Write causes the contents of the data I/O line to be written into each row of the memory array for which the corresponding match register latch is Set. Read causes the contents of the memory array to be placed onto the data I/O line. Each memory array row for which the match register latch is Set will be placed onto the data I/O line. It must be guaranteed that only one latch is Set. The exact manner in which this is done is CAM device specific and is not discussed here.

Matched is an output signal line that is Set if one or more latches in the match register are Set. It is used to check if there were any successful matches, also called responders, to the most recent Match operation.

Basic TS Operation

LINDA manages what is known as a tuple space (TS). A TS is an unordered collection of tuples. A tuple is an ordered set of data items and/or unbound variables. It is described in the references.

The LINDA tuple space concept as extended by this invention:

Allows for the controlled sharing of the CAM resource by multiple concurrent tasks, Yields ease of programming for a CAM device by making all CAM operations variations of the three basic TS operations plus the new extensions, Gives the benefit of a consistent, simplistic and encapsulated interface to a CAM device. This allows for the underlying CAM device to be replaced with one of a different size, configuration, operation or even with a simulation of a real device, while maintaining a uniform application program interface.

The basic TS operations as described in the literature are outlined below. Chart 2 shows some simple TS operations with a description of the action(s) which occur in TS as a result of each.

Let TS be initially empty. In the following, let "?" in front of a character string denote a variable name. The following operations, performed in the order shown, would result in the actions described:

1. OUT(7, "The cat", ?Var): Places the tuple (7, "The cat", ?Var) into TS. Notice that ?Var is a variable which may or may not be bound to a value. Assume for this example that it is an unbound, i.e. free, variable.

2. OUT(20, "Big Dog", Eat): Places the tuple into TS. In this case, Eat is a constant, not a character string; it is not surrounded by quote marks.

3. OUT(15, "Big Dog", Eat): Places a third tuple into TS.

4. IN(20, ?X, Tofu): Queries the CAM to determine if the tuple (20, ?X, Tofu) exists. Note that if ?X is unbound then this field will match anything in the CAM and TS will set the mask register for this field to so indicate. If ?X is bound to a value then the CAM Match operation will match against that bound value in the same manner that it will match again the constant value 20 in the first field. The three tuples in TS do not match this pattern, because Tofu in the third field is a culprit. Thus, the caller suspends.

5. SampleList(?X, ?What, Eat): Scans TS and finds two matching tuples, those with Eat in the third field. Both are returned to the caller in a manner such an array or list.

6. OUT(20, "Possum", Tofu): Places the tuple into TS. Also, the check against suspended IN operations succeeds. This tuple satisfies the IN shown in step 4 above. The value "Possum" is bound to the variable ?X of the pattern above, and the calling task of the IN operation is resumed.

Sample TS Operations

1. OUT: Places a tuple into TS. Duplications are allowed. If there are suspended IN operations pending against TS they are checked against the newly added tuple to determine if they match and thus may be released.

2. IN: Checks TS for a matching tuple, i.e. one that will bind with the pattern given in the call of IN. If there is no matching tuple, the caller suspends until a suitable tuple appears in TS. If a matching tuple is found, it is bound to the pattern and unbound variables are bound if values are available from the tuple. The tuple is removed from TS.

3. READ: Same as IN, but the tuple remains in TS.

New Extensions to TS

This disclosure sets forth the following three additional operations to the tuple space interface. They were developed and added during the course of researching how to better use TS to query and manipulate data stored in a CAM.

1. ReadList: Same as READ but all matching tuples in TS are read and placed into the caller's data structure, such as an array. The caller suspends if there is no matching tuple in TS.

2. Sample: Same as IN but the tuple remains in TS and the caller does suspend if there is no matching tuple in TS.

3. SampleList: Same as ReadList but does NOT suspend.

See the illustration showing sample TS operations with explanations including SampleList.

The ReadList and SampleList extensions allow for the easy searching for and extraction of multiple matching components from TS, i.e. the CAM. They find, mark and examine all components which satisfy the match pattern, either in the CAM or the LINDA sense.

The two Sample extensions allow for synchronizing the multiple access to CAM problem. A tuple can be used as a use/free/lock indicator. Sampling that tuple, which would be a shared and common datum, would indicate what process is using the CAM. Since the LINDA system by design prevents more than one process from accessing TS concurrently, we have recognized that a tuple stored in TS, and known and shared among all processes, can effectively be used to accomplish the synchronization. The two sample operations allow a process to determine if the CAM, i.e. TS, is available without blocking as READ or IN would cause.

Combining TS with CAM

The following table shows the combination of TS and CAM and the mutual similarities of the two which we have defined. While the TS operators rd( ), in( ), and our( ) were defined for tuple space in LINDA those definitions has not been applied to CAM organizations. Our table defines our basic sub-set paradigm of three operators OUT, IN, READ, (these being TS operators equivalent for tuple space operations in a global memory environment like LINDA) and also describes their extensions which we have developed and prefer to use in our preferred embodiment and which are also applicable to the general purpose computer system environment where LINDA has been employed. In any given system, some of these three basic operators may be used along with others with our preferred extensions.

This table also defines the basic operators function for CAM suspended task(s) and NO suspended task(s). It will be noted that we have defined the operators such that the EVAL operator of LINDA may be eliminated with our preferred computer device.

The left column shows the TS operation which results in the CAM operations shown in the right column. Reading in the opposite direction, the multiple CAM operations of the right column are replaced by the simpler and more direct TS operation of the left column.

The mask loaded into the mask register is built by the TS operation from its input. For those TS fields which are constants or bound variables, the mask field is set to match on those fields. For unbound variables in the pattern for IN, READ, ReadList, Sample and SampleList, the mask field is set to don't care, i.e. match with anything in this pattern field in the CAM words.

| TS Operation | Equivalent CAM Operation(s) with suspended task(s) | Equivalent CAM Operation(s) with no suspended task(s) |
|---|---|---|
| OUT | CAM MATCH followed by CAM WRITE to unused CAM location. The currently suspended task(s) (IN, READ or ReadList) are checked immediately against the newly added tuple upon copletion of the CAM WRITE. Should they match the new tuple, the suspended TS operation is completed. In the case of a suspension because of IN, the tuple just added will be removed. | CAM MATCH followed by CAM WRITE to unused CAM location. |
| IN | CAM MATCH followed by CAM READ with possible suspend if no matches are found. If a match is found in CAM, a CAM WRITE is performed to remove the matching record from CAM. Only one record will be extracted if multiple matches exist in the CAM. | Same as at left |
| READ | CAM MATCH, then CAM READ with suspend if not matches in CAM. | Same as at left. |
| ReadList | CAM MATCH followed by multiple CAM READs to access and read all matching words in CAM. Caller will suspend if there are no matches in CAM. | Same as at left |
| Sample | Same as READ but the caller will not suspend if there is no matching | Same as at left. |

| TS Operation | Equivalent CAM Operation(s) with suspended task(s) | Equivalent CAM Operation(s) with no suspended task(s) |
| --- | --- | --- |
| | record in the CAM. | |
| SampleList | CAM MATCH followed by multiple CAM READs to access and read all matching words in CAM. Caller will not suspend if there are no matches in CAM. | Same as at left. |

The three extensions mentioned above are useful additions for LINDA and similar language constructs as extensions of the base operators. Any existing system and others that can be designed which can use LINDA (and LINDA compilers such as C-Linda, FORTRAN-Linda) can also use our own primitives. An example of a system where our primitives may be employed is a system of IBM called the RTAIS system. In accordance with our own developments, a computer may be provided with a CAM. The CAM is enveloped for control functions by our sub-set paradigm. Such a system may be used by a generic CAM having a CAM memory array with a pattern register. In addition, the system which may use our sub-set paradigm will desirably be provided with a mark register, a result store device which stores the result of a request after a successful match. In addition, the computer system may have, but is not required to have, a mask register to speed up the operations by filtering matches.

When combined with other language constructs applicable to the particular computer and operating system (e.g. DOS, 370, UNIX, etc.) and language independent constructs (.e.g. LINDA) and a compiler, the computer may be made to execute programs written for the computer system. Our basic primitive set is a pre-compiler language structure sub-set paradigm input to a computer system having means (ALU and storage) to execute programs. The preferred primitives is the IN, OUT and READ set of operations which we have defined. In addition, we have defined ReadList, Sample and SampleList as extensions of our basic paradigm sub-set.

We have defined the sub-set paradigms that we have developed for use by systems which can be serial processor computer systems, parallel processor computer systems, which systems can be tightly or loosely coupled. The myriad of applications and configurations and computer architectures which may make use of the basic building block we have developed for use in future generations of computers may be endless. The implementation of designs which are possible are left to the future imagination of others and our own further toils. In the process of definition, we have used a development card developed by Coherent Research of Syracuse, N.Y., with some consultation by IBM. This development machine has been described in a reference cited herein (6) which has not only a content addressable memory chip but also a PS/2 (IBM trademark) which has been provided by Coherent Research Inc. at Syracuse, N.Y. The current preferred CAM system which has more capability than the PS/2 version is the chip employing P-CAM and the systems which utilize its function. Other CAM systems are available.

Our system can be used in conjunction with a co-processor and in distributed systems. It could be used in SIMD and MIMD systems. Indeed, the language construct extensions and application process improvements to a computer system which we have developed are applicable to such systems as those referenced by some of the developers of LINDA before the IEEE in 1988 which described their own attempts to create a system which would be useful in MIMD systems. Such systems include LISP and PROLOG processors, the "Transputer", the RISC machines, and others referenced by LINDA investigators. Our improvements are useful in development of decision table languages and parallel execution architectures which will use applications developed for Expert Systems.

EXAMPLES OF PRIMITIVE USE WITH COMPILERS

An example of of our work relating to Decision Table Languages (DCL) may be useful.

Decision tables (DT) may be used and processed in machines with tuple space operations and functions. Production rules may be developed with TS (tuple space) operators employed for maintaining facts and for pattern matching.

The following discussion may provide a useful example, where CLIPS is used, of pseudo code for translation into the C language with the use of the TS function. Translation into DTL (Decision Table Language) would be possible. These examples may be understood to use a pseudo code representation which will be understood by programmers having a basic familiarity with C and by at least some programmers having skill in their art and having had two years of quality practical experience with the C language.

The examples on the following eight pages are examples of preferred embodiments used in connection with a solution to production control use of our inventions and the code illustrated in pseudo code is take from actual run time code.

EXAMPLES OF PREFERRED RUN TIME STATEMENTS AND THEIR ENVIRONMENT

Free and Bound Variables and Constants

The first and easiest translation of CLIPS rules into an implementation using TS is to perform the pattern match against a free variable, followed by matching against a bound variable or a constant.

The following discussion uses rules and facts for the management of automobiles on a rental car lot. The on-lot WME appears for each car physically on the lot. The car is identified by the vehicle identification number. Characteristics of each car are given by a manuf WME.

The following two patterns check for all vehicles on the lot that are subcompacts and have air conditioning. The first pattern binds the vehicle identification number to the free variable ?vin. The second pattern then checks for the two restricting characteristics. Assume that there is one car on the lot. The case of multiple facts matching a pattern is discussed later.

```
        (on-lot    ?vin)
        (manuf    ?company subcompact air ?vin)
```

The C code translation appears as follows:

```
RP2RC = READ( &CLassOL, BOUND,
       &VIN,    FREE,      /* bind ?vin */
       &tmp1,   FREE,      /* don't care */
       &tmp1,   FREE,      /* don't care */
       &tmp1,   FREE);     /* don't care */
if ( RP2RC ) return;       /* RC = 0 if tuple found */
RP3RC = READ ( &ClassMan, BOUND,
       COMP,    FREE,      /* bind a value to company */
       &SUBc,   BOUND,     /* match constant */
       &Air,    BOUND,     /* match constant */
       &VIN,    BOUND);    /* match vin */
if ( RP3RC ) return;              /* RC = 0 if tuple found */
```

The first read statement causes the binding of the variable vin. READ will match against those subfields which are flagged as BOUND and not match those which are FREE. It will copy the binding values from the tuple into those FREE variables and not alter BOUND variables. In this example each CAM word is subdivided into five portions: the WME, class and four attribute/value subfields. The syntax of the READ call is to provide the address of a variable to be matched against or to have a variable bound to it, and for each variable a flag indicating which of the two actions is to be performed.

For the first READ the variable ClassOL has been preloaded with a constant indicating the class on-lot. Matching to the bound value is forced. The second variable, VIN receives its value from the tuple, if one is found, which matches the READ request. The other three subfields are not of consequence. They also receive values which are bound to a temporary variable tmp1.

The next READ now uses VIN in the last subfield but now it has a value and matching to that value is forced. The same is done for the variables SUBc and Air which have preloaded values.

Disjunction in Patterns

Disjunction, as shown in the following CLIPS segment, adds complexity as more than one value needs to be compared against, simultaneously, in the same field. There are two methods to implement this:

1. Perform a match against TS, with READ or IN, using subcompact for the second subfield value. If there are no matches repeat using compact in that position.

2. Perform two matches against TS, one with each of the values, and collect the results of both matches into a list. The list is then traversed as needed. Multiple instances of a WME class, which is what is occuring here, are discussed in more detail below.

```
(on-lot    ?vin)
(manuf    ?company    subcompact | compact    air    ?vin)
```

Conjunction standing alone in a pattern element is not of much use. For example, in the above rule for the manuf class, if the "|" were replaced with "&", the logical AND connector, the car would have to be both a subcompact and a compact simultaneously. The AND connector comes into use with other connectors such as for the following construction:

```
(on-lot    ?vin)
(manuf    ?company    ?size & ~deluxe    air    ?vin)
```

Processing for conjuction is similar to disjunction. The basic CAM GPLB operator is modified.

Negated Condition Element

The second field in the second pattern indicates that field cannot contain the value subcompact.

```
(on-lot    ?vin)
(manuf    ?company ~subcompact air ?vin)
```

The C code implementation performs the NOT test within the C code after a pattern has been found:

```
/* (manuf    ?company    ~subcompact air ?vin) */
RP2RC = READ( &ClassMan, BOUND,       /* match the class "manuf" */
       &COMP, FREE,                   /* bind a value to company */
       &Qsize, BOUND,                 /* bind for later testing */
       &Air, BOUND,                   /* match constant */
       &VIN, FREE);                   /* bind vin */
if ( RP2RC ) return;       /* RC = 0 if tuple found */
if (Qsize == SubC) return; /* NOT compare of sub-field two failed */
```

Here, should a tuple be found, the first if, another test is applied. If the value bound to Qsize is not SubC, which is a constant containing the value representation for a subcompact, the pattern matching continues.

Negated Condition

Negated conditions are used to insure that the working memory does not contain a certain fact. In the following CLIPS rules the first pattern is negated. Should working memory contain a fact of class on-lot the LHS will fail. If vin is bound then this pattern is used to check for the absence of a particular car.

```
not (on-lot    ?vin)
    (manuf    ?company subcompact air ?vin)
```

The C code translation for first pattern above is shown below. The SAMPLE TS operation is used as blocking of the calling program is not desired. If a tuple matching the pattern is found the variables will be bound accordingly and the return code will be set. Since the LHS is to fail should a match in TS be found, the if statement causes a return to the task scheduler and the rule is aborted.

```
RP3RC = SAMPLE( &Class3, BOUND, /* match the class: on-lot */
        &VIN, FREE,     /* bind any value for the VIN */
        &tmp1, FREE,    /* don't care */
        &tmp1, FREE,    /* don't care */
        &tmp1, FREE);   /* don't care */
if ( RP3RC ) return;            /* RC = 1 if tuple found.  */
```

As mentioned above, if ?vin is to be used to look for the absence of a particular vehicle, the FREE for the first sub-field would be changed to BOUND.

Multiple Instances of a WME Class in TS

Simply checking TS for the existence of a WME is not always sufficient to satisfy a pattern. Consider the following rule which creates a new WME. Notice that the WME class, goal-is-to, of the new fact is the same as the fact which satisfied the first pattern.

```
(defrule climb-indirectly ""
    (goal-is-to get-onto ?obj)
    (object ?obj ?place ?sittingon ?)
    (monkey ?place   ^?sittingon & ^?obj    blank)
    (not (goal-is-to get-onto ?sittingon))
=>
    (assert (goal-is-to get-onto ?sittingon))
)
```

After this rule has fired there will be at least two facts in TS which have class goal-is-to. Further, the first subfield of both has value get-onto. A simple READ or IN against TS will do one of two things:

1. In the case of a deterministic TS, the READ or IN will get the same Tuple each time.

2. In the case of a non-deterministic TS, the READ or IN will get the correct tuple 1/x times, where x is the number of tuples with the same class.

A more complex check against TS is needed. The following shows the translation for the first pattern:

```
/* (goal-is-to on ?obj) */
RP1RC = READLIST( &Class, BOUND,
        &on,    BOUND,  /* must match "on" */
        &Fld2,  FREE,   /* ?obj */
        &tmp1,  FREE,   /* don't care */
        &tmp1,  FREE,   /* don't care */
        &TupleList );
if ( !RP1RC ) return;           /* RC >= 0 if tuple(s) found */
for ( i1=1; i1<=RP1RC; i1++)
{ • • •
    Code for other patterns of this rule
        • • •
    TupleList[i1].Fld2 • • • /* Use of one of the possible
                             bindings for Fld2 */
        • • •
    if (• • •) continue; /*This is the innermost test: for the 4th
                         pattern*/
    goto Rule27RHS; /* We've found a satisfying combination of
                    WMEs in TS. Take us out of LHS code and
                    into RHS processing code */
    • • •
}
exit; /* If we get to this point in the LHS code, all patterns
      have failed. The rule does NOT fire. */
/******************/
Rule 27RHS:
    • • •
```

The READLIST pulls all matching tuples from TS. The loop then cycles through the list binding ?obj successively to each matching tuple. For pattern tests within the loop, when a pattern fails to find a matching tuple it executes the continue statement which in C causes the innermost loop to iterate. This is the action to "backtrack" the loop to the next list item. Multiple patterns in a loop become nested loops. A successful match at the innermost point of the nest causes a goto to the code which processes the RHS actions.

Without specific knowledge of a fact class' behavior the inferencing system must implement inner match operations, i.e. IN, READ, SAMPLE, as SAMPLE. To use IN or READ can cause a rule to become blocked awaiting a specific WME class, while other class occurrences go unprocessed. Consider the following rule from the M&B problem:

```
(defrule hold-object-to-move
    (goal-is-to move ?obj ?place)
    (object ?obj ^place ? light)
    (monkey ? ? ^?obj)
    (not (goal-is-to holds ?obj))
=>
    (assert (goal-is-to holds ?obj))
)
```

The M&B problem allows for the possibility of several move and holds goals to be active at one time. Also, there are multiple objects in existence in this problem. The monkey may need to move a key to one location and the ladder to another location. He needs to hold each of those items to affect the move and he needs to hold the bananas to eat them. If this CLIPS rule is implemented with the nested loops based on READLIST the first level loop may hang-up. A certain move goal for ?obj will be bound to pattern one. If the ?obj is not located by the second pattern, it might be locked in a chest, the rule will block until a WME enters WM to satisfy pattern two. However, other move goals which should be processed by this rule will not be processed as the rule is blocked waiting on a particular WME. This also sets the stage for inter-rule deadlock.

TS tests inside the initial READLIST must be implemented with SAMPLE or SAMPLELIST to prevent the rule from blocking. If no suitable WME is found the rule aborts. It will retry at the next iteration of the scheduler or when any WME which might satisfy the rule appears, depending on the implementation method.

READ or IN may be used if it can be assured that only one WME of the matching class will exist in WM at any one time. Thus, with the absence of that WME, the rule cannot be satisfied regardless of the other partial matches. Processing is enhanced in this case as the scheduler should keep the LHS blocked until a WME appears in WM.

Implementing all TS Checking with READ

An alternate solution allows for the pattern tests to all be implemented with READ or READLIST TS queries. This should result in a more efficient implementation as the task scheduler will not activate a rule until the needed WME is available. Using SAMPLE causes a rule to recheck TS with each task scheduler iteration as the rule pattern does not block.

Implementing all tests with READ requires more work on the part of the OUT operation. When a WME of class x is placed into TS, all blocked rules which have a pattern of class x must be removed from blocked status. Further, they must be reset to allow each to resume execution at the beginning of the LHS patterns. This overcomes the rule lockup problem described in the previous section. Consider the defrule hole-object-to-move shown above. Should it not find a suitable WME of class object it will block at the second pattern. Now assume a WME of class goal-is-to is asserted. Rule hold-object-to-move is unblocked and will start execution with the first pattern. Thus, although previously blocked at the second pattern with a WME already partially bound to the first pattern, the rule is now available to try firing with the new goal-is-to WME.

WME Deletion

The previous discussion leads to another consideration, that of WME deletion while a rule is blocked. Consider a rule x which binds a WME w to variables in pattern 1. The rule then blocks on pattern two. While rule x is blocked rule y's RHS executes. Suppose one of the actions of y's RHS deletes WME w. Should rule x become unblocked it will have bound to, temporary variables, the values from a no longer existent WME.

The implementation needs to be designed to handle this possible occurrence. Some possible methods are:

Restart a rule's execution at the first pattern. This will cause all temporary binding to be deleted, thus insuring the removal of any (possibly) now invalid ones. This is at the expense of recomputing all the bindings again.

WMEs can be tagged to indicate which rule patterns they have temporary bindings to. When deletion occurs all rules affected could be restarted from their first patterns.

A rule is directly affected if a WME bound to a pattern is deleted. However, a rule is possibly affected if a list of WMEs have been obtained from WM but the deleted WME has yet to be tried against the rule's pattern. Thus, if a WME of class c is deleted and a pattern in a blocked rule already has a binding to WMEs of class c, the rule pattern, and hence the rule, may be affected by the deletion.

The above method could be enhanced so that if pattern p in rule r could have been affected by deletion of a WME the rule, when it becomes unblocked, is rolled back to pattern p. This assumes the current block point is a pattern "later" in the rule than pattern p.

We have described our preferred embodiments, first in connection with a system which may use LINDA, and be a general purpose system, and we have also described our improvements in connection with a a Generic CAM machine, with the understanding that it may be expected that the highest performances may be obtained with the preferred implementation using a P-CAM application which has been fully described in the parent application, and which is fully incorporated herein by reference.

While we have described our preferred embodiments of our inventions, it will be understood that those skilled in the art, both now and in the future, upon understanding these discussions will make various improvements and enhancements which fall within the scope of the claims which follow. These claims should be construed to maintain the proper protection for the inventions first disclosed.

What is claimed is:

1. A computer system having a data base and process controls, comprising:

an instruction processing unit;

an associative memory;

process control means for performing a lazy evaluation of memory containing said data base, including a lazy evaluator means for processing tasks when there is a near expected change to have a guarantee of success of a match request;

working memory element (WME) control means for matching working memory elements according to rules and providing for rapid WME delete action, and an underlying content addressable memory CAM, and language construct control operator means for accessing tuples in memory and for accelerating operational matching of match queries by use of system components.

2. A computer system according to claim 1 wherein said language construct operator control means includes OUT, an operator causing a CAM MATCH followed by a CAM WRITE to an unused CAM store location; any of set of currently suspended task(s) (IN, READ or ReadList) being checked by execution of OUT immediately against a newly added tuple upon completion of the CAM WRITE; and should they match the new tuple, the suspended TS operation is completed; but in the case of a suspension because of an IN operator, the tuple just added will be removed; for an operation(s) with NO suspended task(s) OUT executes CAM MATCH followed by a CAM WRITE to an unused CAM location.

3. A computer system according to claim 1 wherein said language construct operator control means includes IN, an operator causing CAM MATCH followed by a CAM READ with a possible suspend if no matches are found; if a match is found in CAM, a CAM WRITE is performed to remove the matching record from CAM; and with IN only one record will be extracted if multiple matches exist in the CAM.

4. A computer system according to claim 1 wherein said language construct operator control means includes READ, an operator causing CAM MATCH, then a CAM READ with suspend if no matches in CAM.

5. A computer system according to claim 1 wherein said language construct operator control means includes ReadList is an operator causing CAM MATCH followed by multiple CAM READs to access and read all matching words in CAM; a CALL will suspend if there are no matches in CAM.

6. A computer system according to claim 1 wherein said language construct operator control means includes Sample, an operator causing CAM MATCH, then a CAM READ with suspend if no matches in CAM; but a CALL will not suspend if there is no matching record in the CAM.

7. A computer system according to claim 1 wherein said language construct operator control means includes SampleList is an operator causing CAM MATCH followed by multiple CAM READs to access and read all matching words in CAM; a CALL will not suspend if there are no matches in CAM.

8. A computer system according to claim 1 wherein said computer system is a parallel associative processor system.

* * * * *